United States Patent

Kennedy, Jr.

[15] 3,662,886

[45] May 16, 1972

[54] HANDLING APPARATUS FOR PARTICULATE DRY PRODUCT

[72] Inventor: Alvin B. Kennedy, Jr., Alvin, Tex.

[73] Assignee: Catalyst Services, Inc., Alvin, Tex.

[22] Filed: Feb. 5, 1970

[21] Appl. No.: 8,919

[52] U.S. Cl. ...............................................209/250, 209/30
[51] Int. Cl. .................................................B07b 1/28
[58] Field of Search..................209/30, 241, 250, 262, 318, 209/247, 26–29, 34–37; 302/59

[56] References Cited

UNITED STATES PATENTS

| | | | |
|---|---|---|---|
| 2,713,977 | 7/1955 | Noll | 209/30 X |
| 1,575,457 | 3/1926 | Stebbins | 209/34 |
| 1,302,531 | 5/1919 | Dilley | 302/59 |
| 1,340,164 | 5/1920 | Golloher | 302/59 |
| 1,695,383 | 12/1928 | McCarthy | 209/37 X |
| 2,634,842 | 4/1953 | Caylor | 302/59 |
| 2,762,506 | 9/1956 | Fine | 209/27 |
| 3,111,719 | 11/1963 | Novotny | 209/29 X |
| 3,250,389 | 5/1966 | Scruby et al. | 209/250 |

*Primary Examiner*—Frank W. Lutter
*Assistant Examiner*—Ralph J. Hill
*Attorney*—Bertram H. Mann, Frank B. Pugsley, James G. Ulmer, Delmar L. Sroufe and Larry B. Feldcamp

[57] ABSTRACT

Particulate dry product of more-or-less fragile nature, such as pelletized catalysts, is transported by suction in an air stream to a vibrating screen system and the classified particles caught by the screen or screens are directed through air lock devices to collection receptacles. The air and fine material which pass through the screens continue in the closed system through further separating devices for dust and fine particles and thence through the suction pump.

4 Claims, 2 Drawing Figures

PATENTED MAY 16 1972

3,662,886

Alvin B. Kennedy, Jr.
INVENTOR

BY Bertram H. Mann
ATTORNEY

HANDLING APPARATUS FOR PARTICULATE DRY PRODUCT

BACKGROUND OF THE INVENTION

1. Field of the Invention

This invention relates to apparatus for classifying, cleaning, and reclaiming valuable particulate materials, such as pelletized catalysts.

2. Description of the Prior Art

U.S. Pat. No. 3,409,126 of the present inventor discloses and claims dry, pelletized catalyst reclaiming apparatus including a mechanical elevator which carries the product from a storage hopper to separating screens, thence through discharge conduits for the classified material. The dust and fines are separated from the transport air by means of suitable trap and filter devices. Air is admitted to the system at various points both to assist in softening the fall of the particles and in carrying away dust and fines separated from the product as by agitation. No prior art with which applicant is familiar discloses the concept of handling valuable particulate materials, as spent catalyst, in a closed suction system and in which attrition and breakage of the particles are reduced to such extent as in the present invention.

SUMMARY OF THE INVENTION

In accordance with the present invention, a snorkel-like suction pipe directs the spent particles from a storage bin or wagon to vibrating screens in a separator housing whence the classified materials trapped by the screens are discharged through selective conduits to various receptacles. The conduits are provided with air locks which substantially prevent the leakage of air therethrough. The dust and fines and transport air which pass through the classifying screens are continued through separator devices to a suction pump. Thus, a closed, suction transport system is provided. Attrition and breakage are reduced by the provision of retarding baffling at the connection between the intake piping and the screen housing.

DESCRIPTION OF THE PREFERRED EMBODIMENT

Figures 1, 2:
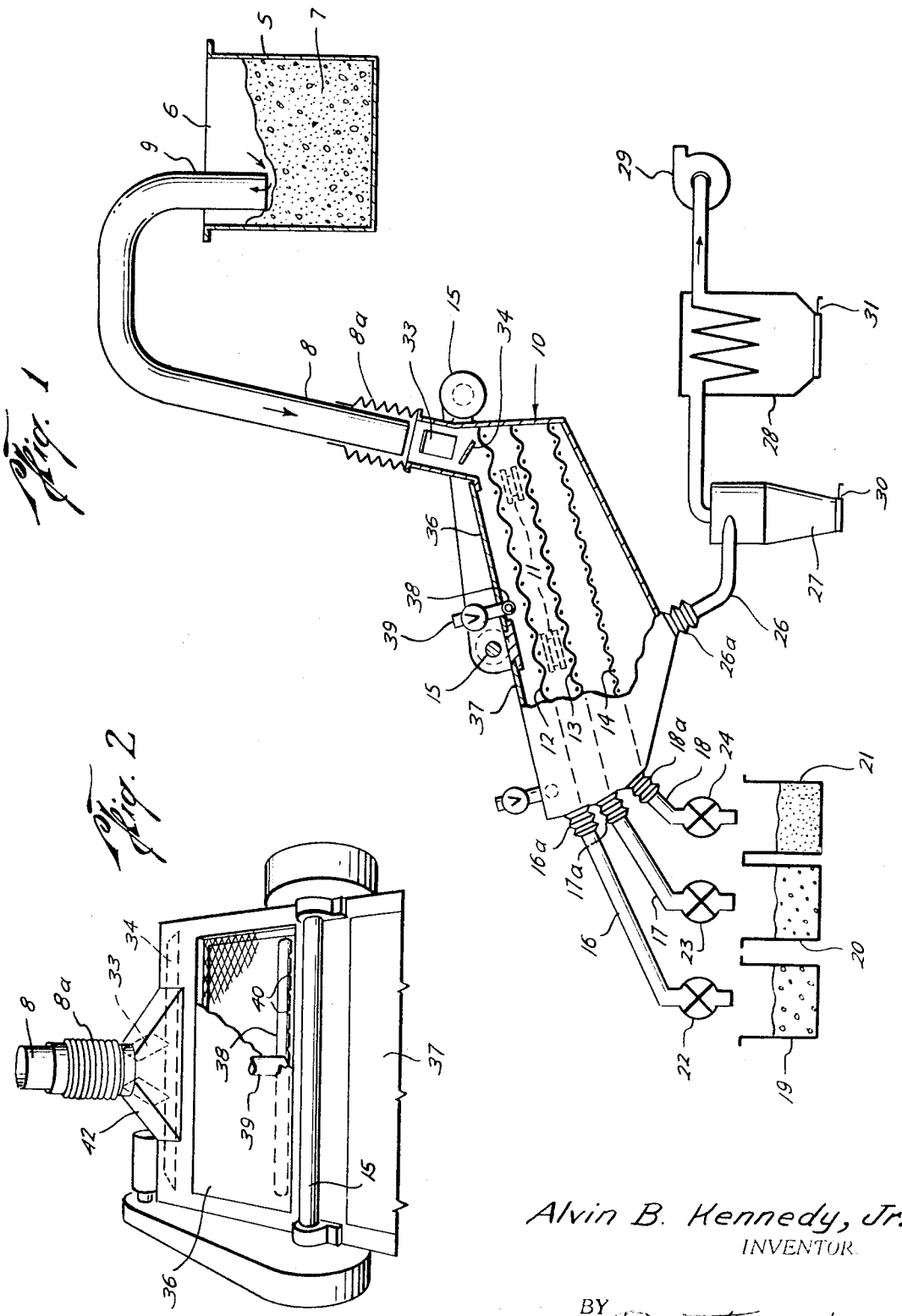
FIG. 1 is a schematic representation, partly in section, illustrating the various components incorporated in the apparatus.
FIG. 2 is a partial elevation of the classification box taken from the left-hand side of FIG. 1.

The drawing illustrates a suitable bin or storage compartment 5, open at the top 6 for receiving spent catalyst or other particulate material 7, the upper surface of the material being exposed to the ambient atmosphere. A pipe 8 having a re-entrant, usually flexible nozzle 9, which enters bin 5, extends to the upper right-hand edge of a housing or casing 10 which is mounted on resilient supports designated 11. Within housing 10 is a series, in this case three, of superposed separating screens 12, 13, and 14 of progressively increasing fineness. The screens may be flat and parallel and slope downwardly and leftwardly from the right-hand of housing 10 beneath pipe 8. A motor-powered vibrator 15, utilizing, for instance, eccentric rotating weights, is mounted on top of housing 10 for agitating the housing and classification screens. Extending from the left-hand end wall of housing 10, each immediately above the lowermost edge of one of the screens 12, 13, and 14, are discharge conduits 16, 17, and 18 leading into receptacles 19, 20, and 21 for collecting classified materials which are held or trapped by screens 12, 13, and 14. Paddle wheel-type air lock devices 22, 23, and 24 are provided, respectively, in the outlet ends of conduits 16, 17, and 18 for substantially limiting the passage of air upwardly into the conduits. In operation, such air locks usually are rotated by suitable powering means (not shown). Each of the pipes 8, 16, 17, and 18 is provided with a flexible connection to housing 10, as at 8a, 16a, 17a, and 18a.

Extending from the bottom of casing 10 through flexible connection 26a is a pipe 26 which passes through a cyclone or other type fines collector 27 and a dust filter collector 28 to a suction pump 29 also powered by a motor (not shown). At the bottoms of devices 27 and 28 are doors 30 and 31 which are normally closed and which can be periodically opened for removing collected dust and other fine material extracted from the carrier air.

A diffuser 42 at the outlet of pipe 8 is provided with the baffles 33 and 34, the latter preferably flexible, which serve to deflect and therefore retard the velocity of the transport air and the carried product particles so that their force of impact against upper screen 12 will be reduced and the attrition and breakage of the particles also reduced. The top of casing 10 is closed by removable panels or doors 36 and 37 to the under sides of which are secured transverse pipes 38 with valved inlet nipples 39. Pipes 38 are provided with outlet apertures 40.

OPERATION

The separator housing 10 and its piping 8 and 26 and discharge conduits 16, 17, and 18 may be mounted on a suitable trailer or other transport vehicle so as to be moved to strategic positions to and/or about an industrial plant where the reclaiming of particulate material, such as catalyst particles, is to be performed. Nozzle 9 of feed pipe 8 is then moved into proximity with the exposed surface of the spent product 7 accumulated in bin 5, and the motors for operating suction pump 29, vibrator 15, and air locks 22, 23, and 24 are then turned on. As air is sucked into nozzle 9, particulate material from the bin 5 is carried with it and through pipe 8 and delivered to upper screen 12. The air and product move more slowly as they enter casing 10, and baffles 33 and 34 assist this retardation so as to reduce breakage and chipping of the pellets in striking the screen.

The agitation of the screens causes the material to roll downwardly therealong, while dust and other fines which can pass through the screen are progressively dropped upon and through lower screens 13 and 14. Air jets from nozzle apertures 40 aid in separation of dust and fines from the larger pellets.

The material trapped on the screens, as explained, will be caused to move by agitation downwardly along the screens and out the corresponding discharge conduits 16, 17, and 18, thence through the corresponding air locks into the collection receptacles. At the same time, the carrier air and solid particles which pass through the screen system are successively subjected to cyclone fines collector 27 and dust collector filter 28 which substantially eliminate all solid particles from the air. The clean air is then drawn through the suction pump and discharged to atmosphere. Periodically, for instance as bin 5 is emptied, the doors 30 and 31 may be opened to clean out collected dust and fine materials from the collectors. Also, the classified, cleaned, and reclaimed product in receptacles 19, 20, and 21 is ready for reuse as desired.

The closed suction transport system as described, while handling the air-borne particles with exceptional gentleness so as to reduce dust formation and breakage which are incident to other devices for a similar purpose, still has ample means for fully separating any dust or fines or broken pieces from the product actually reclaimed. The separated dust and fines also are trapped so that the carrier air discharged into the atmosphere is substantially free of solid or other pollutant material.

While a suction system utilizing atmospheric air as the carrier is shown, any suitable carrier gas, for instance, an inert gas, may be substituted therefor and the word air as used in the subsequent claims is intended to cover any such gaseous carrier. Also, the particular arrangement and functioning of the separator screens or other foraminous sheets may be varied as desired in accordance with the product treatment to be effected. The exclusive use of all modifications as come within the scope of the appended claims is contemplated.

I claim:

1. Pneumatic apparatus for classifying, cleaning, and reclaiming particulate dry product of the catalyst class comprising:
   a. a storage bin for product to be treated;
   b. a suction pump;
   c. reclaimed product collection receptacle means;
   d. a separator casing comprising at least one separator screen attached to and traversing said casing and inclined downwardly from a product inlet end to a product outlet end of said casing, inlet diffuser means disposed above said screen at said product inlet end of said casing, and means for agitating said casing;
   e. inlet carrier air and product piping means flexibly connected to said inlet diffuser means and communicating with said storage bin;
   f. product outlet means at said product outlet end of said casing and at the end of said screen for removing classified product retained on said screen, discharge piping means flexibly connected to said product outlet means and communicating with said collection receptacle means, said discharge piping means comprising air lock means preventing passage of air while permitting discharge of product;
   g. air outlet piping means for removing carrier air, dust and fines from said casing and flexibly connected to said casing beneath said screen and intermediate said product inlet end and said product outlet end;
   h. means for separating dust and fines from said carrier air connected in line between said air outlet piping means and said suction pump;
   i. said diffuser means being of greater cross-sectional area than said inlet piping means for causing expansion of air carrying said product from said inlet piping means with a resultant reduction of velocity of said product;
   j. horizontal baffle means for distributing said product along the inlet end of said screen.

2. The pneumatic apparatus of claim 1 wherein said casing comprises a plurality of substantially parallel superposed separator screens of progressively finer mesh size and wherein a said product outlet means, a said discharge piping means, and a said collection receptacle means is provided for each of said plurality of screens.

3. The pneumatic apparatus of claim 1 wherein said casing comprises at least one air inlet port means disposed above said screen and spaced from said diffuser means for delivering supplemental cleaning air against product on said screen.

4. The pneumatic apparatus of claim 1 wherein said horizontal baffle means are flexible.

* * * * *